(12) United States Patent
Barbe et al.

(10) Patent No.: US 8,190,797 B2
(45) Date of Patent: May 29, 2012

(54) AUTOMATIC SOURCE CONCENTRATOR FOR A MULTIMEDIA SYSTEM

(75) Inventors: Christophe Barbe, Antony (FR); Georg Hofmann, Champigny sur Marne (FR)

(73) Assignee: Parrot, Paris (FR)

( * ) Notice: Subject to any disclaimer, the term of this patent is extended or adjusted under 35 U.S.C. 154(b) by 106 days.

(21) Appl. No.: 12/677,274

(22) PCT Filed: Aug. 26, 2008

(86) PCT No.: PCT/FR2008/001206
§ 371 (c)(1), (2), (4) Date: Sep. 2, 2010

(87) PCT Pub. No.: WO2009/060135
PCT Pub. Date: May 14, 2009

(65) Prior Publication Data
US 2010/0325323 A1    Dec. 23, 2010

(30) Foreign Application Priority Data
Sep. 28, 2007 (FR) ...................... 07 06810

(51) Int. Cl.
*G06F 13/12* (2006.01)
(52) U.S. Cl. ........................................... 710/62
(58) Field of Classification Search ..................... 710/62
See application file for complete search history.

(56) References Cited

U.S. PATENT DOCUMENTS
2006/0112179 A1    5/2006    Baumeister et al.

FOREIGN PATENT DOCUMENTS
WO    2007074245    7/2007

*Primary Examiner* — Henry Tsai
*Assistant Examiner* — Juanito Borromeo
(74) *Attorney, Agent, or Firm* — Haverstock & Owens LLP

(57) ABSTRACT

The concentrator couples a plurality of digital and analog sources to an audio/video reader system suitable for reading one of the sources. Each available source is associated with a source identifier and an activated or deactivated state flag, as a result of the user taking action on a source. A register (42) contains an identifier of the current source being read, and a multiple-level LIFO stack (44) stores an ordered list of identifiers of other sources on standby waiting to be read. When a new source is activated, automatic means replace the content of the register with the identifier of the new source so as to substitute the new source for the current source in order to enable it to be read by the system, and concurrently said automatic means add the identifier of the current source to the stack. The inverse operation is performed when the current source is deactivated, with the most recent source contained in the stack being substituted for the current source so as to enable it to be read by the system.

14 Claims, 3 Drawing Sheets

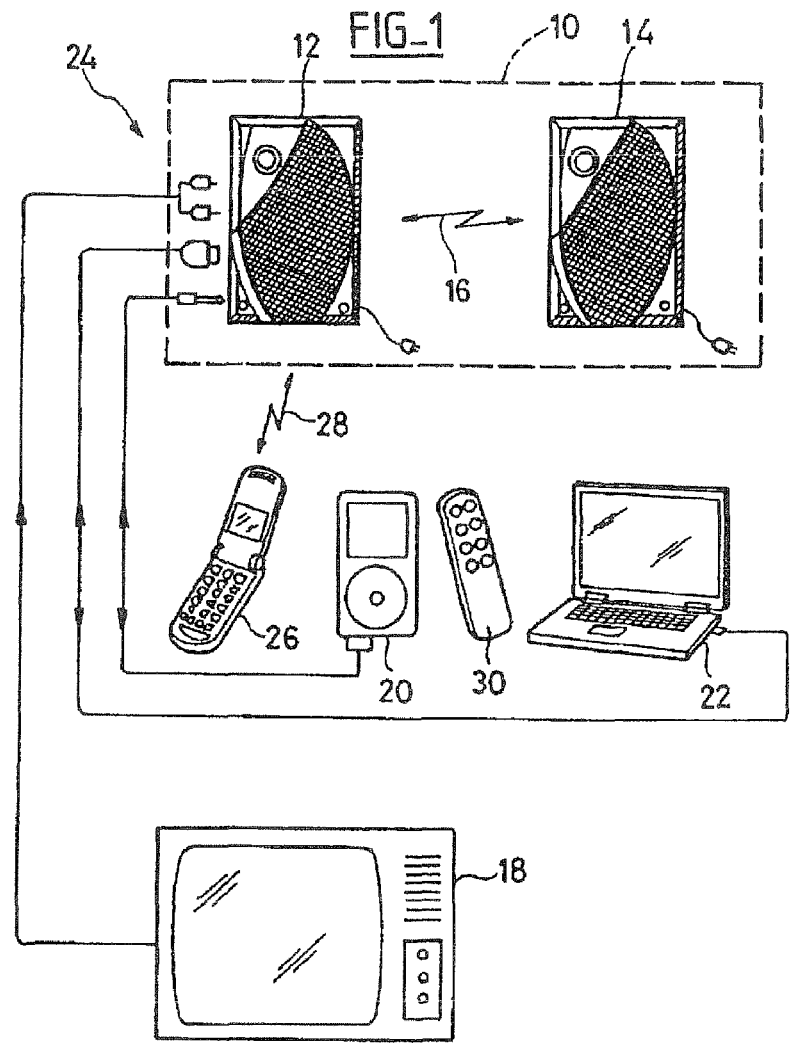
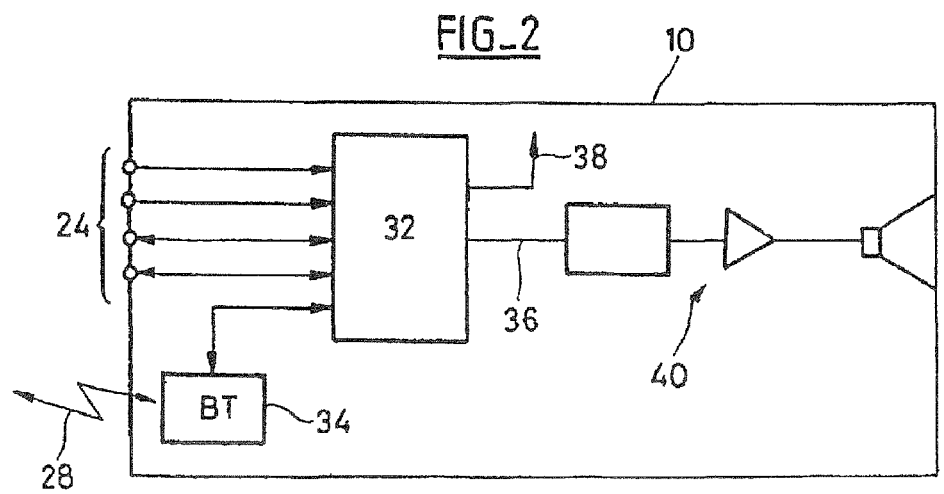

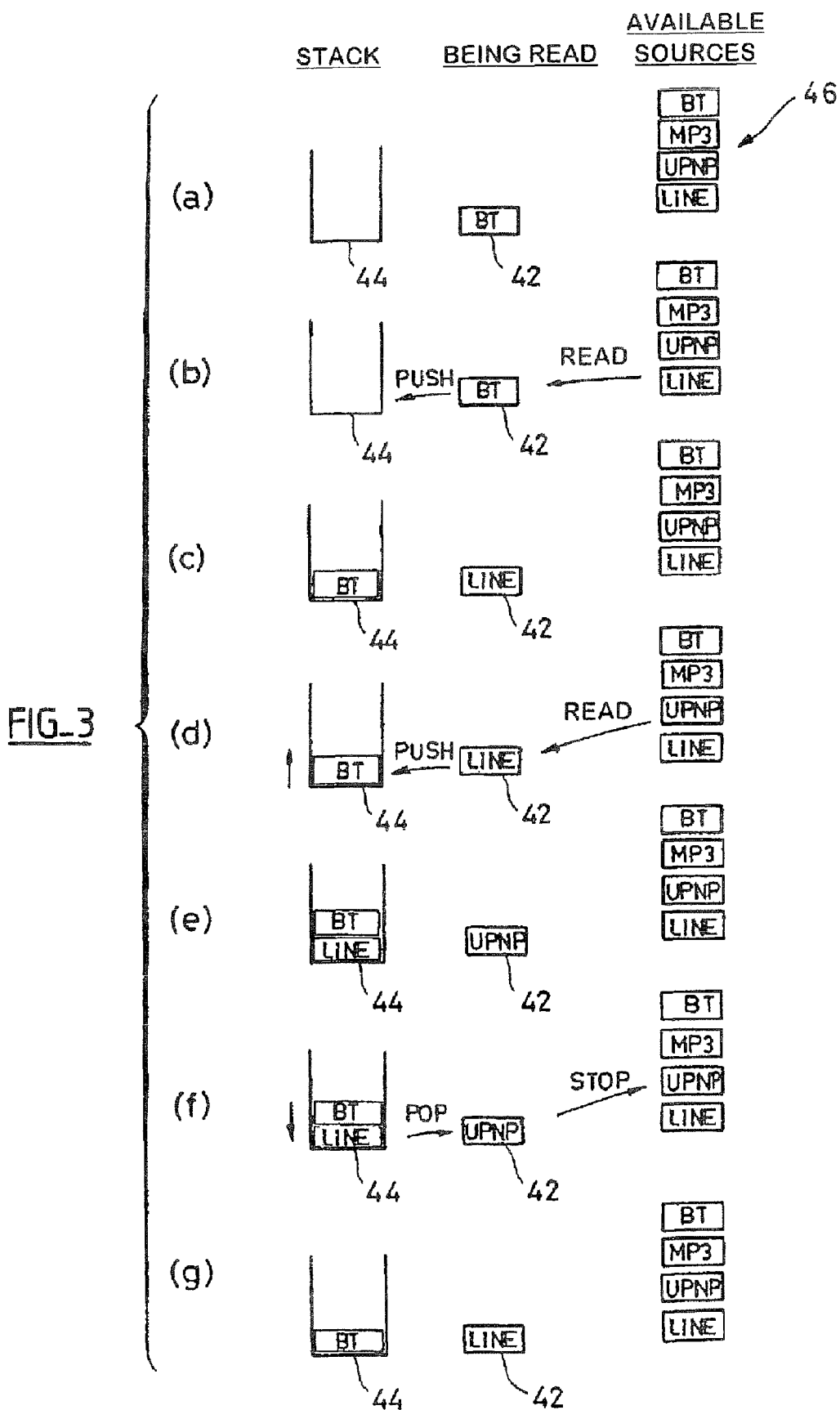
FIG_3

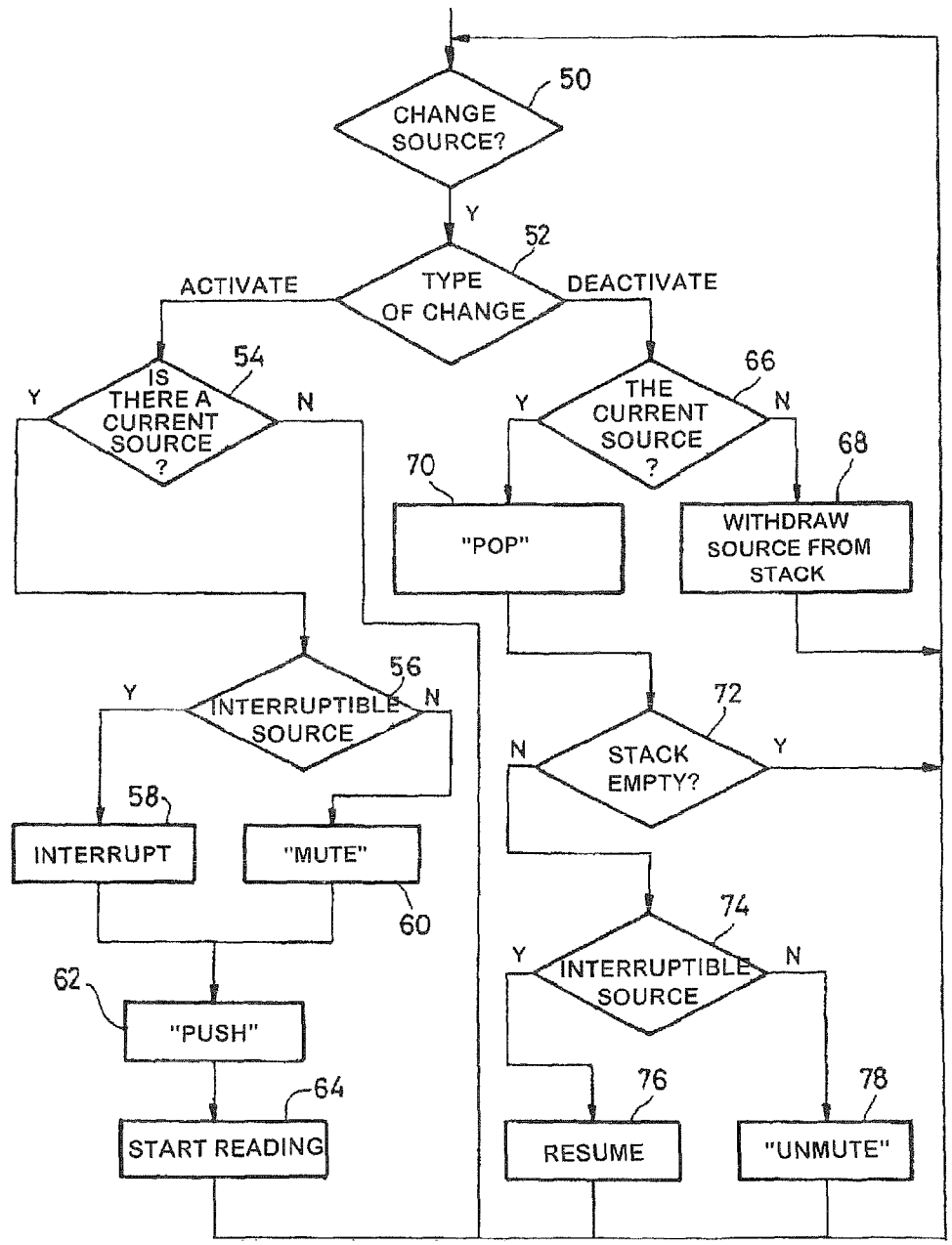

AUTOMATIC SOURCE CONCENTRATOR FOR A MULTIMEDIA SYSTEM

The invention relates to a method and a device for automatically managing and selecting digital and/or analog sources available at the input of an audio or an audio/video system, hereinafter referred to as a "multimedia system".

Modern multimedia systems may be connected to a very large number of external signal sources, both analog sources and digital sources.

The multimedia system is provided with various interfaces necessary for coupling to the various sources. Coupling may be over a wire connection using suitable connectors: an MP3 player, a TV, or some other source using a communications standard such as the Sony/Philips digital interconnect format (S/PDIF), a universal plug-and-play (UPnP) standard, Ethernet, etc. Coupling may also take place via a wireless connection of the Bluetooth type (registered trademark of SIG Bluetooth Inc.), of the WiFi type, etc., enabling the multimedia system to be remotely coupled to sources such as a cell phone, a computer, etc.

US 2006/0112179 A1 describes a system in which a multitude of peripherals and sources are networked together. When the user selects a particular content that is to be read, the system searches for the best application for reading the content and the best peripheral for rendering it. For example, if the user desires to play a video on a TV screen, the system determines whether there is a source where said content is present at high definition (since that will lead to best rendering on a TV screen), determines the best application for decoding a signal coming from said source, etc.

The present invention relates to a different problem, namely that of managing conflict between a plurality of concurrent sources that are active simultaneously. After resolving the conflict, the content of the selected source is reproduced in unambiguous manner by the appliance, and specifically without seeking to optimize rendering.

Usually, when a plurality of sources are connected simultaneously to a single multimedia system, in order to select one source for listening from amongst all of those sources, the user needs to perform some specific action or manipulation so as to control a switch enabling the appropriate source to be selected within the multimedia system.

That switch may be implemented in various ways. For example, on hi-fi amplifiers, it is generally an electrical switch controlled by a button or key in a front panel. On computers, or systems that are controlled by a microcontroller, a specific graphics interface is usually provided, e.g. in the form of a menu from which the user selects one of the headings in order to change source.

In those various elements, the device does not have particular automatic response, and it is up to the user to interact with the system in order to select the source.

In certain systems, priorities are sometimes allocated to certain sources: for example in multimedia systems for cars, selecting the telephone is given priority over the other sources (radio, music, . . . ) in the event of an incoming call or of a call being sent.

Furthermore, when the user couples a new source to the reader system, certain manipulations are needed. For example, if the user is connecting an MP3 player to the system and wants to listen to it, it is necessary to switch on the player, and then to select the corresponding signal input on the system.

WO 2007/074245 A (Seydoux) describes one such type of multimedia system suitable for being connected to a variety of sources via wires (connections) or via wireless coupling.

In that known device, the sources are managed using a static priority order, the Bluetooth audio source having higher priority than the audio source connected to the "line" input. If the system reads an audio stream S coming from the Bluetooth source, then rendering of the audio signal applied to the "line" input will be inhibited so long as the Bluetooth stream is not interrupted. Furthermore, if the system is reading a signal coming from a source connected to the "line" input, that source will always be interrupted in the event of an incident Bluetooth stream appearing.

The object of the invention is to propose a method and a device enabling the various manipulations to be reduced so as to make a multimedia system easier to use, without it being necessary for the user to select the source explicitly, and without ordering the various sources in a hierarchy as a function of specific static priorities.

In general, the object of the invention is to propose an automatic switching technique that is "intelligent" for selecting from amongst the various sources that are simultaneously active and connected to a multimedia device, with this taking place without any explicit instruction from the user, and without making use of some frozen priority that is a function of a hierarchy specific to the various sources.

Essentially, the invention proposes a technique of managing and selecting sources that enables the system to respond appropriately to the mere fact of a source being activated or deactivated: for example a TV set may be switched on by taking action on the remote control of the TV set, a telephone equipped with a Bluetooth interface may be activated, a song may be selected on an MP3 player, etc.

The invention is based on the observation that under all circumstances when a new data stream coming from an external source is detected by the multimedia system, that implies the existence of a user intention: the user has switched on an appliance, directed an audio stream coming from a wireless appliance of the system, programmed an appliance to send an audio stream at a given instant, etc.

Essentially, in the invention, since the device can render only one source, automatic switching relies on allocating and managing dynamic priorities for the various competing sources, with these priorities being modified and varying as a function of context.

At any given instant, the highest priority is that given to any source that is beginning to send data (thereby triggering the beginning of that data being read by the system), with this implicitly being representative of an intention of the user who has switched on an appliance, directed an audio stream from an MP3 player to the system, etc. The other active sources are then interrupted. The most recently interrupted current source is paused, where possible, and its identifier is conserved in memory so as to enable reading thereof to resume as soon as the new source is deactivated, and still without requiring any specific intervention on the part of the user.

More precisely, the method of the invention comprises the steps consisting in: a) associating a source identifier and a state flag to each of the available sources, the state flag being activatable or deactivatable as a result of an action taken by a user on a source; b) defining a register containing an identifier of the current source being read by the system; c) defining a multiple-level stack suitable for storing an ordered list of n source identifiers, with $n \geq 0$, the identifiers being associated with sources other than the current source, which other sources are on standby, waiting to be read; d) on activation of a new source from amongst the available sources other than the current source: replacing the content of the register with the identifier of said new source so as to substitute the new source as the current source so as to enable it to be read by the system; and concurrently, adding the identifier of the current source to the stack; execution of this step being controlled in automatic manner by the system, without the user taking action on the system.

Advantageously, on deactivation of the current source, a step is provided that consists in withdrawing from the stack the identifier of a new source stored in the stack; and concurrently, replacing the content of the register with the new source identifier withdrawn from the stack so as to substitute said source for the current source in order to enable it to be read by the system; execution of this step being controlled in automatic manner by the system, without the user taking action on the system.

The stack may in particular be a stack of the LIFO type, in which the first source to be withdrawn from the stack is the source that was most recently added thereto.

Step d) may further comprise, concurrently with adding the identifier of the current source to the stack, pausing said current source, with the interruptible or non-interruptible type of the source being distinguished, and if the current source is recognized as being interruptible, an interrupt signal being sent to said source to suspend operation thereof.

Step e) may further comprise, concurrently with withdrawing the identifier of the new source from the stack, resuming operation of said new source, and if the source is recognized as being interruptible, sending an interrupt signal to said source instructing it to resume operation.

The invention also provides an automatic source concentrator that implements the various steps of the method set out above. The concentrator is coupled at its input to a plurality of available digital and/or analog sources, and at its output to an audio/video reader system suitable for reading a current source selected from amongst the available sources.

There follows a description of an implementation of the invention with reference to the accompanying drawings in which the same numerical references are used from one figure to another to designate elements that are identical or functionally similar.

FIG. 1 is a diagrammatic view of an audio system coupled to various signal sources.

FIG. 2 is a block diagram of the various elements involved in implementing the invention with the system of FIG. 1.

FIG. 3 shows the sequence for managing the dynamic source selection stack when a new source is activated, and then interrupted.

FIG. 4 is a general flow chart explaining how the method of the invention is implemented.

In FIG. 1, 10 is an overall reference to an audio reproduction system, e.g. such as that described in above-mentioned application WO 2007/074245 A, to which reference may be made for further details (however the invention may equally well be applied to audio and video multimedia systems such as those known as "home cinema" systems).

The system 10 is an audio stream reproduction system having two loudspeaker units 12 and 14 connected together by a wireless connection 16. The system 10 may be connected to a wide variety of kinds of audio source that may be analog or digital.

By way of example, there are shown a television 18 having its audio output connected to a "line" input of the system 10 (pure analog input), a digital player 20 connected by a wire connection and suitable connectors, and a computer 22 used as a digital audio source.

To transmit audio data in the form of a digital data stream, it is possible advantageously to make use of the universal plug-and-play (UPnP) set of protocols, with the data being conveyed over a wired network (e.g. Ethernet), and/or a wireless network (e.g. WiFi). The system 10 of the invention then acts as a media renderer (in the UPnP meaning) serving to recover and play back files that are available on a media server.

These various analog or digital sources are connected to digital connectors 24 via specific connection cables.

The system 10 may also be associated with a remote audio source via wireless coupling, e.g. a telephone and MP3 player given reference 26, that emits an audio stream 28 to the system 10 by using a Bluetooth advanced audio distribution profile (A2DP), for example.

The system 10 may also be controlled using a remote control 30, e.g. a Bluetooth wireless remote control using an audio video remote control profile (AVRCP), however the remote control does not participate in selecting sources in accordance with the invention, which selection is performed automatically.

FIG. 2 is a block diagram showing the various elements that contribute to implementing the invention.

The system 10 essentially comprises a source concentrator 32 that is connected to the various wire connection connectors 24 and to a Bluetooth module 34 for transmitting and receiving signals from and to appliances that are wirelessly coupled to the system.

The single output 36 of the concentrator 32 is connected to a reproduction system 40 (filters, amplifier, and loudspeaker), with a connection 38 being provided for reproducing the other channel of the stereo audio steam.

The concentrator 32 includes means for detecting the arrival of an audio stream on any of its inputs. This detection may be performed in software manner for digital sources, or in hardware manner, e.g. by detecting a signal threshold, for analog sources.

There follows a description of how the source selection method of the invention is implemented within the concentrator 32, the description being given with reference to FIGS. 3 and 4.

The functions described below are advantageously implemented in software by a digital processor, e.g. such as the P5+ chip from the supplier Parrot S.A., Paris, France.

Each of the available sources is associated with a source identifier and with a state flag.

The "source identifier", which corresponds to each of the inputs of the automatic source concentrator 32, identifies the source and its type, and also includes an associated flag, specifying whether this type of source is interruptible or not. A source is said to be "interruptible" when it is associated with the multimedia system via bidirectional coupling so as to enable it to receive interrupt signals from the system that have the effects: i) of suspending the delivery of the audio or audio/video data stream; and then ii) of restarting the delivery of said stream from where it was previously interrupted, on a new interrupt being sent for causing the stream to be restarted.

Amongst interruptible sources, there are sources compatible with a protocol such as UPnP, certain MP3 players of the iPod type (registered trademark of Apple Inc.), or others, etc. Bluetooth sources are interruptible if they support the AVRCP profile. WiFi sources are likewise interruptible.

Amongst the sources that are not interruptible, mention may be made of sources interfaced to the multimedia system using specifications such as S/PDIF, audio streaming or broadcast systems, or indeed purely analog sources connected to a "line" input such as a TV, a turntable, a CD or DVD player, etc.

The source is also associated with a "state flag" that is capable of taking two states, namely activated or deactivated, as a result of an external command applied by a user to the source in question.

The sources are managed by the automatic concentrator 32 by means of a register 42 containing a current source identifier, i.e. the identifier of the source from which the multimedia system is currently receiving a data stream and is reproducing the data stream on the loudspeakers of the acoustic system. There is also provided a multiple-level stack 44 capable of containing a list of interrupted sources on standby that are no longer being read.

In the example shown in FIG. 3, the multimedia system is coupled to four potentially available sources, namely a Bluetooth source (BT), an MP3 player, a digital source using a UPnP protocol, and a source connected to the "line" input.

In this embodiment, the four sources are of different types, but the invention is equally applicable to circumstances in which different sources are of the same type, e.g. two Bluetooth sources, either one of which is capable of being read. The fact that the sources are of different types in the embodiments being described does not imply in any way that this feature is necessary for implementing the invention; on the contrary, the invention is applicable independently of the type of source.

In initial step (a) it is the Bluetooth source that is being read. The register 42 thus contains the identifier of this source.

In step (b), the concentrator detects that the source on the "line" input has been activated, e.g. as a result of connection to a CD player and the play button being pressed on the player. When this detection occurs, the Bluetooth source is paused (since it is an interruptible source, the concentrator can send it a signal instructing it to suspend the data stream that it is sending), and the identifier of the paused Bluetooth source is pushed into the stack 44.

The situation is then as shown in step (c), the audio stream that is being reproduced being the stream delivered by the "line" input.

In step (d), another source is activated, e.g. the "UPnP" source.

The resulting situation is as shown in step (e). It should be observed that the stack 44 contains the identifiers of both sources that were previously in use and that have been interrupted, i.e. the Bluetooth source and the "line" source.

Step (f) illustrates the situation in which the source currently being read (i.e. the "UPnP" source) has just been stopped.

The content of the register 42 is then replaced by the identifier that was last pushed into the stack 44 (the stack is of the "last-in first-out" (LIFO) type, and this identifier is popped from the stack.

The situation is then as shown in step (g), which is identical to step (c), i.e. playback is restored of the data a stream being applied to the "line" input, with the Bluetooth source remaining on standby and ready to be reactivated when the "line" source is stopped.

The scenario given above by way of example may be repeated with any other available source 46.

The flow chart of FIG. 4 explains in general terms the method of the invention for managing automatic selection of various sources.

When a change of state, i.e. an activation or a deactivation, is detected (step 50) on any of the sources coupled to the system, the type of the change is analyzed (step 52).

If the change is an activation, the algorithm examines whether a source is already being read (step 54).

If so, depending on whether that source is interruptible or not interruptible (step 56), the source is interrupted by sending a corresponding interrupt signal (step 58), or it is merely ignored, i.e. that source is muted (step 60).

The source that has been interrupted or muted in this way has its identifier pushed into the stack (step 62), and the system then begins reading the newly-activated source (step 64). If there is no source currently being read, then this read step follows on immediately after the test of step 54.

If in step 52, the type of change observed is a deactivation of the source, the algorithm determines (step 66), whether or not the deactivation relates to the source currently being read.

If not, the source is merely withdrawn, where appropriate, from the stack in which its identifier was stored (step 68).

If the source is currently being read, then the algorithm pops the last identifier stored in the stack (step 70); if the stack is empty (test in step 72), the algorithm terminates, otherwise the source having its identifier popped from the stack is tested to determine whether or not it is an interruptible source (step 74).

If it is interruptible, an interrupt signal is sent to the source to cause it to resume sending the data stream that had previously been suspended (step 76).

Otherwise, the device ceases to mute the source, and its data stream (which was not suspended because the source is not interruptible) is once more played back (step 78, unmute).

The above-described algorithm is suitable for managing interruptions and activations of sources at several levels, by allocating dynamic priority to each of the interrupted sources, i.e. priority corresponding to position within the stack, with the sources being "intelligently" managed.

Furthermore, this source management is entirely automatic insofar as the source concentrator responds immediately and appropriately each time it detects an activation or deactivation of a source by the user, and there is no need for the user to actuate any type of remote control, selection button, etc. forming part of the multimedia system.

The invention claimed is:

1. A method of automatically managing digital and/or analog sources available as inputs to an audio/video reader system (10), the system being suitable for reading a current source selected from said plurality of available sources, the method being characterized by the steps consisting in:
a) associating a source identifier and a state flag to each of the available sources (18, 20, 22, 26), the state flag being activatable or deactivatable as a result of an action taken by a user on a source;
b) defining a register containing an identifier of the current source being read by the system;
c) defining a multiple-level stack (44) suitable for storing an ordered list of n source identifiers, with n≧0, the identifiers being associated with sources other than the current source, which other sources are on standby, waiting to be read;
d) on activation of a new source from amongst the available sources other than the current source:
    replacing the content of the register with the identifier of said new source so as to substitute the new source as the current source so as to enable it to be read by the system; and
    concurrently, adding the identifier of the current source to the stack;
execution of this step being controlled in automatic manner by the system, without the user taking action on the system.

2. The method of claim 1, further including the steps consisting in:

e) on deactivation of the current source:
: withdrawing from the stack the identifier of a new source stored in the stack; and
: concurrently, replacing the content of the register with the new source identifier withdrawn from the stack so as to substitute said source for the current source in order to enable it to be read by the system;
: execution of this step being controlled in automatic manner by the system, without the user taking action on the system.

3. The method of claim 2, wherein the stack (44) is a LIFO type stack, where the first source to be withdrawn from the stack is the source that was most recently added thereto.

4. The method of claim 1, wherein step d) further includes, concurrently with adding the identifier of the current source to the stack, pausing said current source.

5. The method of claim 4, wherein pausing the current source comprises:
: distinguishing the interruptible or non-interruptible type of the source; and
: if the current source is recognized as being interruptible, sending an interrupt signal to said source to suspend operation thereof.

6. The method of claim 2, wherein step d) further includes, concurrently with adding the identifier of the current source to the stack, pausing said current source and further wherein step e) further includes, concurrently with withdrawing the identifier of the new source from the stack, resuming operation of said new source.

7. The method according to claim 5, wherein step e) further includes, concurrently with withdrawing the identifier of the new source from the stack, resuming operation of said new source, wherein resuming operation of the new source comprises:
: if the new source is recognized as being interruptible, sending an interrupt signal to said source to cause it to resume operation.

8. An automatic source concentrator (32), the concentrator being suitable for being coupled at its input to a plurality of available digital and/or analog sources, and at its output to an audio/video reader system (10) suitable for reading a current source selected from amongst said plurality of available sources, the concentrator being characterized in that it comprises:
: means for associating each of the available sources (18, 20, 22, 26) with a source identifier and a state flag, the state flag being activatable or deactivatable as a result of a user taking an action on a source;
: a register (42) containing an identifier of the current source being read by the system;
: a multiple-level stack (44) suitable for storing an ordered list of n source identifiers, with n≧0, the identifiers being associated with sources other than the current source, which other sources are on standby, waiting to be read; and
: control means, controlled in automatic manner by the system without the user taking any action on the system, said control means being suitable, on activation of a new source amongst the available sources other than the current source, for:
:: replacing the content of the register with the identifier of said new source so as to substitute the new source for the current source to enable it to be read by the system; and
:: concurrently, adding the identifier of the current source to the stack.

9. The automatic source concentrator of claim 8, wherein the control means are also suitable, on activation of the current source, for:
: withdrawing from the stack the identifier of a new source stored in said stack; and
: concurrently, replacing the content of the register with said source identifier withdrawn from the stack, so as to substitute said source for the current source in order to enable it to be read by the system.

10. The automatic source concentrator of claim 9, wherein the stack (44) is a stack of the LIFO type, in which the first source to be withdrawn from the stack is the source that was most recently added thereto.

11. The automatic source concentrator of claim 8, wherein the control means are also suitable, concurrently with adding the identifier of the current source to the stack, for causing said current source to be paused.

12. The automatic source concentrator of claim 11, further including means for distinguishing the interruptible or non-interruptible type of the source, and wherein the control means are also suitable, if the current source is recognized as being interruptible, for sending an interrupt signal to said source to cause it to suspend operation.

13. The automatic source concentrator of claims 9, wherein the control means are also suitable, concurrently with adding the identifier of the current source to the stack, for causing said current source to be paused and further wherein the control means are also suitable, concurrently with withdrawing the identifier of the new source from the stack, for causing said new source to resume operation.

14. The automatic source concentrator of claim 12, wherein the control means are also suitable, concurrently with withdrawing the identifier of the new source from the stack, for causing said new source to resume operation and further wherein the control means are also suitable, if said new source is recognized as being interruptible, for sending an interrupt signal to said source to cause it to resume operation.

* * * * *